United States Patent
Giordano et al.

(10) Patent No.: US 9,554,667 B2
(45) Date of Patent: Jan. 31, 2017

(54) RESETTABLE COUNT-UP TIMER FOR BEVERAGE DISPENSE

(75) Inventors: Samuel A. Giordano, Springfield, IL (US); Burton L. Hart, Springfield, IL (US); John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 1501 days.

(21) Appl. No.: 12/860,157

(22) Filed: Aug. 20, 2010

(65) Prior Publication Data

US 2011/0042408 A1 Feb. 24, 2011

Related U.S. Application Data

(60) Provisional application No. 61/235,656, filed on Aug. 20, 2009.

(51) Int. Cl.
*B67D 7/08* (2010.01)
*A47J 31/44* (2006.01)

(52) U.S. Cl.
CPC ...................... *A47J 31/44* (2013.01)

(58) Field of Classification Search
CPC ........................................ A47J 31/44
USPC ..... 222/638–641, 23, 14–22, 1; 99/280–285, 99/233.3
See application file for complete search history.

(56) References Cited

U.S. PATENT DOCUMENTS

| | | | |
|---|---|---|---|
| 5,229,751 A * | 7/1993 | Chandler et al. | 340/618 |
| 6,202,540 B1 * | 3/2001 | Johnson et al. | 99/285 |
| 6,393,966 B1 * | 5/2002 | Hart et al. | 99/280 |
| 7,000,468 B2 * | 2/2006 | Doorhy et al. | 73/301 |
| 7,637,204 B2 * | 12/2009 | Sumser et al. | 99/279 |
| 7,681,446 B2 * | 3/2010 | Morimoto et al. | 73/292 |
| 7,798,373 B1 * | 9/2010 | Wroblewski et al. | 222/209 |
| 7,874,243 B2 * | 1/2011 | Woods | 99/285 |
| 2004/0195263 A1 * | 10/2004 | Lassota | 222/23 |
| 2006/0027597 A1 * | 2/2006 | Chow et al. | 222/129.1 |
| 2008/0175963 A1 * | 7/2008 | Pope | 426/231 |

* cited by examiner

*Primary Examiner* — Lien Ngo
(74) *Attorney, Agent, or Firm* — Barnes & Thornburg LLP

(57) ABSTRACT

A beverage dispensing system which includes a server, a sensing system coupled to the server for detecting a quantity of beverage retained in the server, a display coupled to the sensing system, and a count-up timer coupled to the system. The display may provide indicia as to the time and/or freshness of the beverage in the server. A method for sensing and displaying a quantity of beverage in a beverage server which can also include a freshness indicator. A resettable timer is incorporated which cannot be reset until at least the sensing system has been physically or operatively uncoupled from the server. The resetting may also require the sensing system to detect an empty server upon recoupling the sensing system with the server. Further, the resetting may also require monitoring a refill function for refill occurring within a predetermined rate parameter or time.

10 Claims, 3 Drawing Sheets

RESETTABLE COUNT-UP TIMER FOR BEVERAGE DISPENSE

CROSS REFERENCE TO RELATED APPLICATION

This patent application claims the benefit of priority under 35 U.S.C. §119(e) to U.S. Provisional Application Ser. No. 61/235,656, filed Aug. 20, 2009. The disclosure set forth in the referenced provisional application is expressly incorporated herein by reference in its entirety, including all information as originally submitted to the United States Patent and Trademark Office.

BACKGROUND

The present disclosure relates to a system for monitoring, detecting, and reporting or displaying information relating to the volume, amount and/or level of liquid retained in a beverage dispenser. This disclosure also relates to a system which provides a count-up timer operating in relation to beverage freshness.

The present disclosure relates to a level sensing system used with a server of the type having a dual wall thermal insulating container. This type of server is known as a vacuum insulated server. This type of server includes a controllable faucet for controllably dispensing beverage from the cavity of the server. This type of server is used with a beverage brewing system including a brewer to dispense a brewed beverage from the brewer directly into the server for subsequent dispensing. In such, a beverage brewing system the dispenser is spaced in close proximity to the brewer, generally underneath a brewing funnel so that as beverage is dispensed from the brewing funnel it flows directly into a cavity of the container reducing potential exposure to the surrounding atmosphere and helping to maintain the thermal load in the beverage.

It is desirable to maintain the maximum temperature during the brewing process so that a maximum hold time can be achieved for the freshly brewed beverage. Beverage level sensors, as noted above, are used to identify how much beverage is contained in the server. Additionally, a beverage freshness countdown timer has been developed by the assignee of the present application. U.S. Pat. No. 6,070,771 to Hart shows a system in which dispensing of beverage into the server also initiates a countdown timer during which beverage is maintained in a heated condition.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which.

Figure 1:
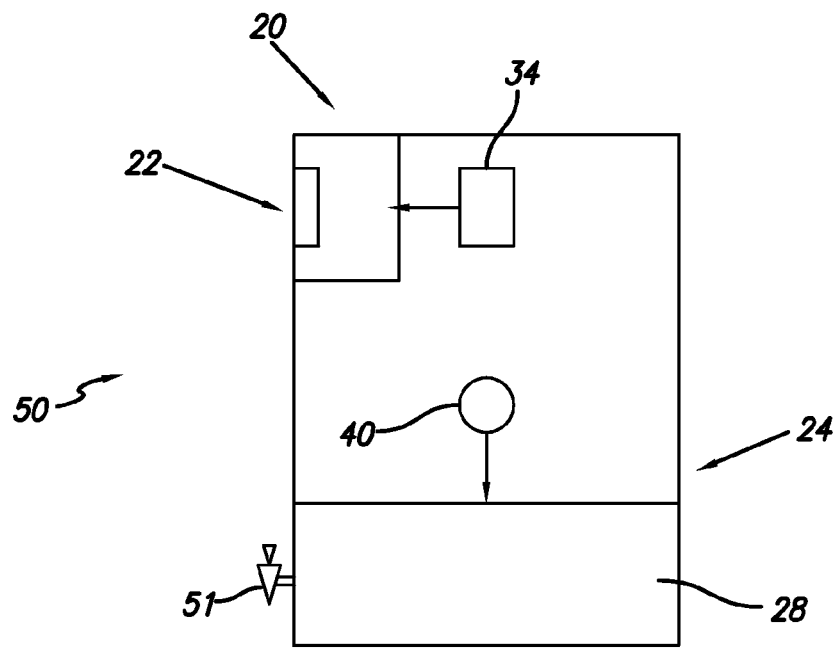
FIG. 1 is a simplified diagrammatic illustration of a beverage sensing system in combination with a beverage server including a beverage sensor, level display, and server.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawings.

With regard to FIG. 1, a beverage sensing system 20 is illustrated in combination with a display 22 and a thermal server 24. The beverage sensing system 20 is to be broadly interpreted to include by way of illustration and not limitation inductive, conductive, acoustic, optical, magnetic, weight or any other type of system which is used to detect at least the level or quantity of beverage 28 (shown diagrammatically) in the thermal server 24.

Similarly, the use of the term "brewing" is intended to be broadly interpreted such that the system may be used with a brewer or may be used with any other system in which substances are combined to produce a desired beverage. Similarly, while brewing is often associated with using heated water in combination with a brewing substance, other liquid temperatures may be employed such as ambient or chilled liquid temperatures. As such, the term brewed, brewing or similar terms are provided by way of illustration and not limitation. Additionally, the term "display" is used herein with regard to a visual display. The term display is intended to be broadly interpreted and is used by way of illustration and not limitation. While a visual display is anticipated and described herein, and such a visual display may be manifested in many different forms, the display may also be interpreted to be an audible, tactile or other sensory display which can be perceived in a similar manner as disclosed herein.

With regard to FIG. 1, the sensing system 20 is associated with the thermal server 24 to detect the level or quantity of beverage 28 in the server 24. In this regard, the sensing system 20 is associated with the server 24. The sensing system 20 may be removably associated with the server 20 so as to contact or otherwise detect the quantity of beverage in the server 24. It may also be permanently attached or somewhat remotely associated with the server 24 such that only a portion of the sensing system 20 is directly associated with the server 24 and/or the beverage 28 retained therein.

Similarly the display 22 may be integrated with the sensing system 20 or may be a separate component associated with the sensing system 20. In this regard, the display 22 may be directly attached to the sensing system 20 or positioned remote from the sensing system 20. The display 22 is coupled to the sensing system 20 so that the sensing system 20 can detect the level or quantity of beverage 28 in the server 24 and communicated to the display 22 for display purposes.

The coupling between the sensing system 20 and the server 24 may be a physical coupling or nonphysical coupling. In this regard, a physical coupling can be direct contact with the beverage 28 or server 24 whereas a nonphysical coupling may be indirectly sensed by the sensing system 20. Similarly, the display 24 may be physically coupled to the sensing system 20 or may be nonphysically coupled. In this regard, a physical couple between a display 24 and sensing system 20 might be in the form of wiring, optical connections, or other directly physical contacts. Such physical contacts may be hard wired or may be removably couplable. Similarly, the display 24 may be a wirelessly coupled to the sensing system 20. A nonphysical coupling may include radio frequency, acoustic, optical, microwave, Bluetooth, or any other nonphysical coupling.

Figure 2:
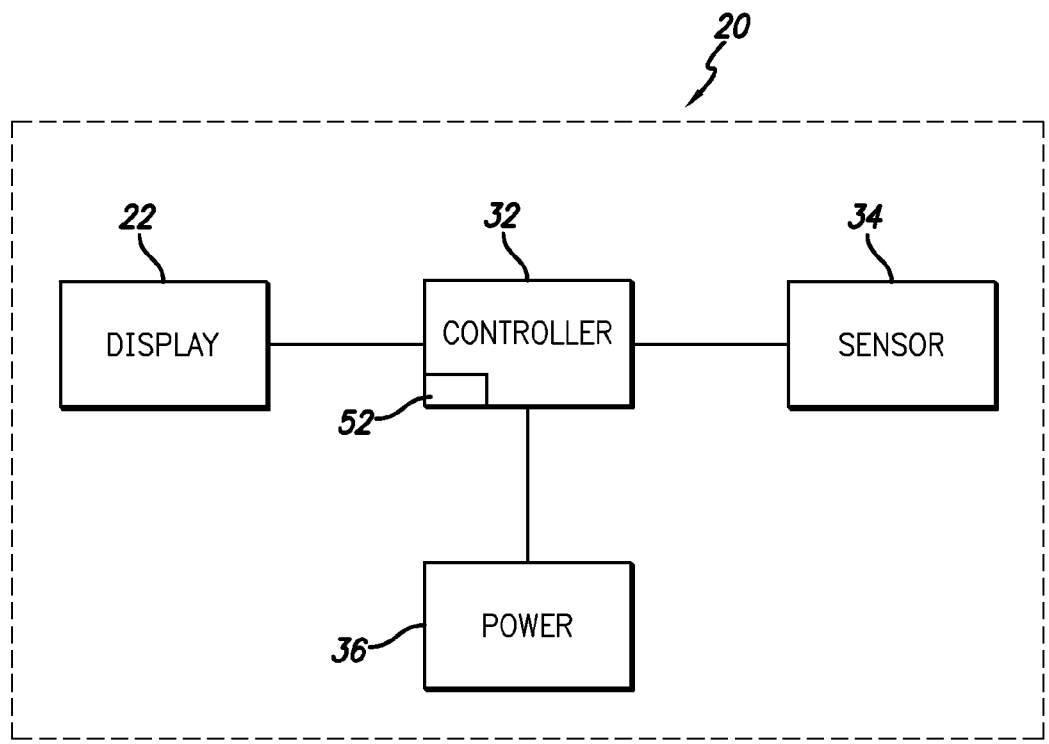
FIG. 2 is a simplified diagrammatic illustration of the beverage sensing system including a controller, a sensor coupled to the controller, a power source coupled to the controller, and a display coupled to the controller.

With regard to FIG. 2, a general diagrammatical illustration shows the display 22 coupled to a controller 32 and a sensor 34 coupled to the controller 32. Power 36 is also coupled to the controller 32, display 22, and sensor 34. The sensing system 20 includes at least the controller 32, the sensor 34, and power 36. The display 22 is coupled to or is part of the sensing system 20. With regard to FIGS. 1 and 2, the sensor 34 is associated with the server 24 to provide a detection 40 of the level of beverage 28 in the server 24. The indication shown in FIG. 1 of the level 40 is not a physical embodiment but is intended to provide an illustrated example of a level. One embodiment of the sensor 34 might include a device which extends into the beverage 28 in the server 24 to provide detection by physical contact with the beverage 28, by the sensor, of the level 40.

Figure 3:
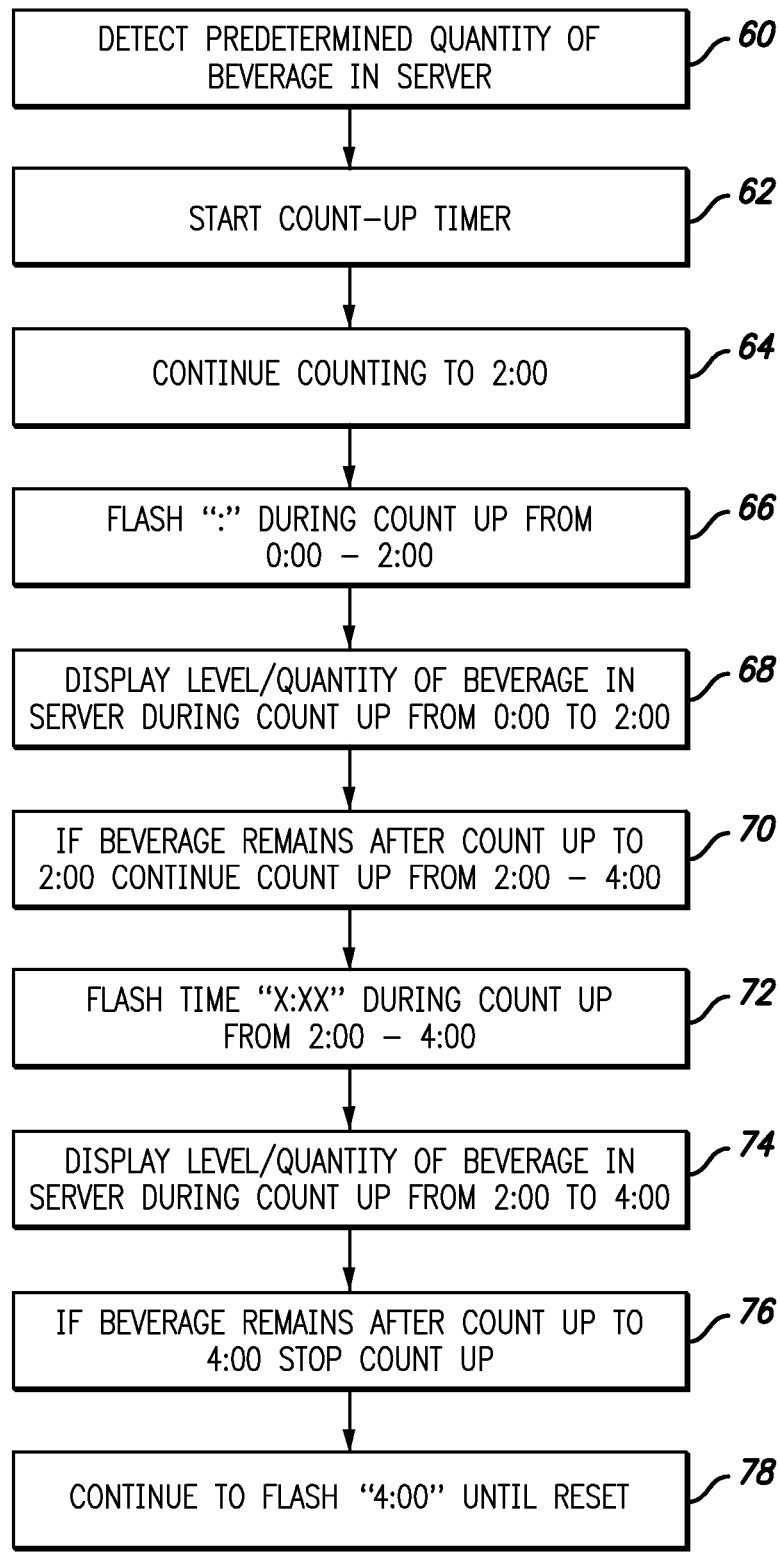
FIG. 3 is a diagrammatic chart indicating process flow associated with a count-up timer for use with the disclosed system.

The method of use of the sensing system 20 in combination with the server 24 and display 22 is disclosed herein with regard to FIG. 3. In this regard, it would be desirable to provide a beverage dispensing system 50 which allows for the monitoring of the level 40 in combination with freshness detection. While a brewer unit is not shown, one of skill in the art will recognize that a brewer and server 24 are well known and the system 20 of the present disclosure will find utility with a wide range of brewer and server combinations. A faucet 51 is provided on the server 24 for controllably dispensing beverage from the server.

Freshness detection as used herein is a function of the time in which the beverage 28 remains in the server 24. The freshness detection may be limited solely to a time based freshness characteristic or may be combined with other characteristics such as brewing temperature, type of brewing substance used, permissible temperature and time ranges as well as other relevant characteristics such as light transmission, pH, change in solids, or other relevant characteristics. The use of the term "freshness" is intended to be broadly interpreted and is used by way of illustration and not limitation.

The level sensing system 20 of the present disclosure also uses a "count-up" timer 52 coupled with the controller 32. This is in contrast to traditional "countdown" timers. The difference with a count-up timer 52 is that time is incremented upward to a predetermined time. The time may be predetermined at a particular upper range or may be unlimited. Generally, the preferred embodiment of the present disclosure includes at least one upper time limitation.

Also, the display 22 shows the associated freshness indicia such as time using an active display. In this regard, at least some portion of the time indicia is active. In this regard, a preferred embodiment of the present disclosure uses a standard time notation including hours and minutes, "hr:min". In this form of indicia, the active element is the ":" 66 (FIG. 3) which is directed to flash at a particular or predetermined rate.

Additionally, the count-up timer in at least one embodiment of the present disclosure counts the time upward to a first predetermined time 68 (FIG. 3) and then continues the counting up to a second predetermined time 76. Counting or incrementing of the timer from zero to the first predetermined time 68 includes a flashing colon ":" 66. The incrementing of time from the first predetermined time 68 to the second predetermined time 76 may include flashing minutes, flashing hours 72 or both flashing minutes and hours in combination with the flashing colon. This example of a first active indicia 66 and a second active indicia 72 is provided by way of illustration and not limitation. Additionally, any variety of combinations of active indicia may be developed to provide the desired active indicia affect where there is some form of differentiation between the first time 68, the second time 76, and may include other subsequent times. Additionally, it is anticipated that a first active indicia 66 may be used with a second static indicia or a first static indicia may be used with a second active indicia. Again, the use of the indicia is intended to be broadly interpreted and is provided by way of illustration and not limitation.

Also, as the indicia attains the second predetermined time 76 the counting or incrementing of the time can be stopped. While it is anticipated that the counting can continue and perhaps to a third or additional subsequent indicia, it is anticipated that there may be some upper boundary such as the second time at which the counting will stop. This may be useful in order to limit the displayed time to a upper limit 76.

In use, the use of active indicia is helpful to indicate or signal to the operator of the equipment a first predetermined time range 68. This generally indicates to the operator that regardless of the other characteristics the beverage retained in the server can be interpreted as being "fresh". During the second time period 76 an alternative form of indicia as described above may be used to indicate to the operator that the product, while fresh, is approaching a second phase of freshness. This may be an alert to the operator to check the level and dispose of a low volume of beverage depending on the customer traffic cycle or other considerations. For example, if a beverage is brewed and dispensed into the server 24 towards the end of a morning rush hour, and the second time period is indicated, the operator may wait to dispose of the remaining lower level of beverage knowing that a second rush hour may occur within an hour or two. This would allow the operator to provide fresh coffee while minimizing the waste associated with disposing of beverage which falls within the predefined freshness parameters.

Figure 4:
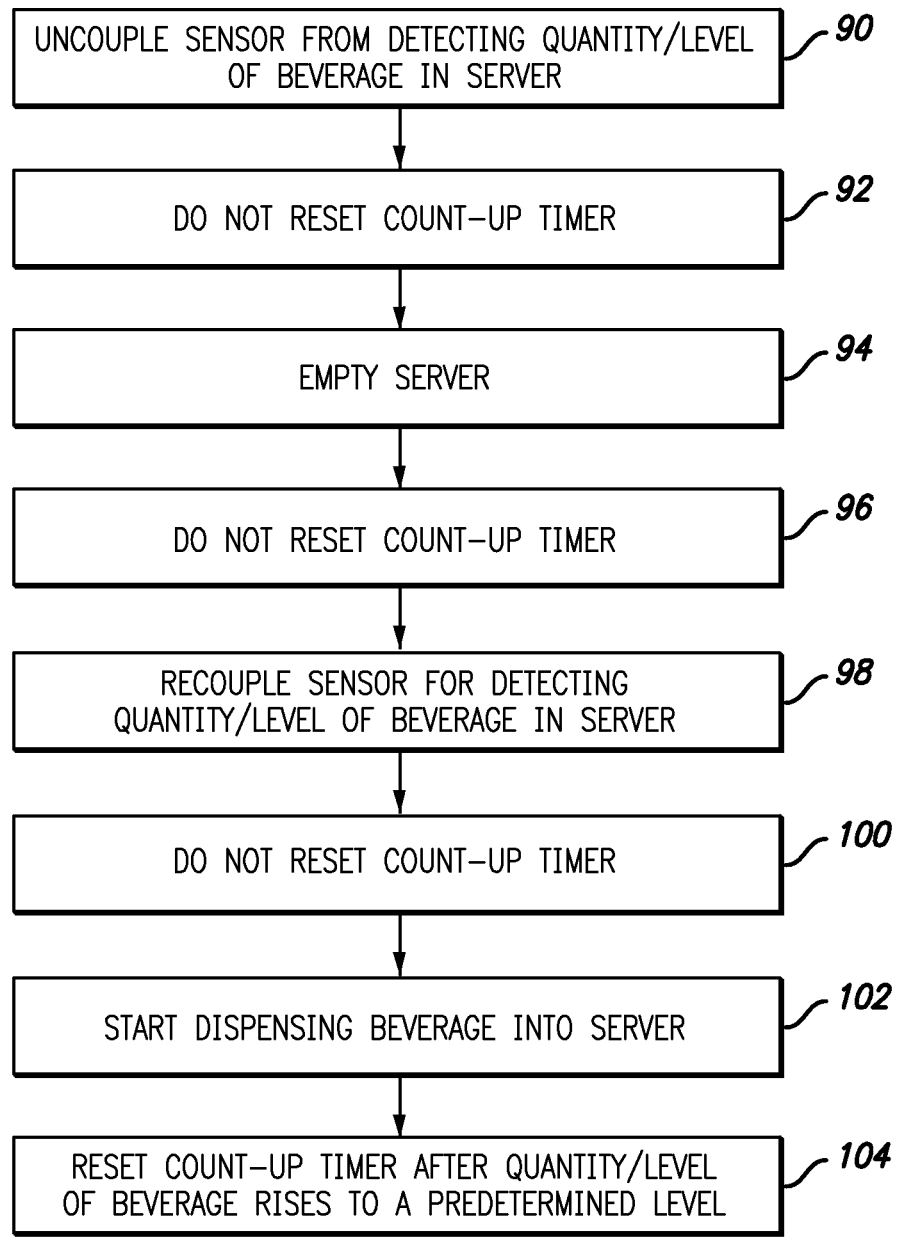
FIG. 4 is a diagrammatic chart indicating process flow associated with resetting of the count-up timer for use with the disclosed system.

Turning to FIG. 4, another important factor associated with dispensing of fresh beverage is requiring a reset of the count-up timer 104 when the server 24 is emptied, the beverage is emptied because it is no longer fresh, or beverage is otherwise disposed of from the server. In this regard, it may be undesirable to allow an operator of the equipment to reset the timer without providing verification that fresh beverage is actually dispensed to the server 24. In this regard, the sensing system 20 can be configured to require removal or uncoupling 90 of the sensing system 20 from the server 24. While removal from the server 24 may be interpreted as a physical removal from the server, this may also be achieved through other disconnection of the sensing system. Regardless of the method used, once the system detects that the sensing system has been removed 104 from the server a first step of the resetting process will be achieved. A second step may include requiring emptying 94 of the server 24. In this regard, while the sensor cannot detect that the server is in the process of being emptied it can detect an empty server once it is replaced or recoupled 98 to the server 24. This will allow for a second level of verification associated with the sensing system. A third constraint might be in the form of requiring detecting of beverage in the server to a predetermined level 104. This third level would prevent a server being tipped sideways to indicate a low or empty level and then returning the server to an operating position. A dwell time for the sensing of an empty condition can be programmed into the system so that a momentary tipping, incidental sloshing while carrying, or other action that might otherwise reset the system does not result in indicating an empty condition.

As an additional matter, a beverage server refill rate can be programmed into the system. The rate can be generally associated with the rate of dispensing beverage into the server. This may be useful so as to prevent an operator from removing beverage from the server by placing it in a second container and then returning the beverage to the server after the server has been effectively reset. In other words, it is anticipated that an operator dispensing beverage back into a server manually would occur at a much faster rate than the dispensing of beverage from a brewing process. In this regard, it may take approximately 3-6 minutes to dispense a gallon of freshly brewed coffee into a server during the brewing process. It is anticipated that an operator would not want to return beverage poured from the server to the server at such a slow rate. Rate detection by calculating the change in level over time can be used to thwart any undesirable circumvention of the system.

In combination, and in use, the system is used to detect the level or quantity 40 of beverage 28 in a server 24. The information relating to the level or quantity is displayed on the display by any form of indicia indicating level. In this regard, bars, portions of a pie chart, or other indicia may be used to indicate the level of the beverage in the server. The indicia may be in the form of information which any person may readily detect or may be designed to provide information to the operator while not making the information intuitively clear to a customer. In this regard, it may be desirable to veil some information so that the operator knows to brew another quantity of beverage. However, such veiling may be useful so as to not allow a customer to determine a certain level of beverage. This is for no other reason than to prevent the customer from accidentally, unintentionally, or mistakenly refraining from dispensing beverage which is fresh. While the beverage is generally assured of being fresh by use of the approved freshness time ranges, a customer might not find it desirable to dispense beverage from a low level of beverage in the server on the mistaken belief that a low level indicates less fresh coffee. The contrary could be true during various parts of the day. The level could be low because the coffee is so good it is difficult for the operator to keep the server filled during peak sales periods.

Similarly, the time indicia might also be similarly veiled. Once again, the veiling of the information is not intended to obfuscate information from the customer but rather to prevent a customer from not dispensing otherwise fresh coffee based on a misinterpretation or mistaken belief as to the freshness of the beverage. In this regard, the operator will set predetermined freshness ranges based on predetermined freshness characteristics. Such ranges may also be preset or remotely controllable. The coffee will be fresh based on the operator's own self interest of serving fresh coffee so as to achieve, maintain, and develop loyal customers and repeat business. However, it may not be desirable to display actual time if the operator is concerned about the appearance of freshness related to time.

In contrast, the system also allows for the display of the actual time and freshness so that a customer can observe specific and clear indicia of the time and/or associated freshness of the beverage. It may be desirable to specifically and intentionally clearly and intuitively display time if, for example, the operator markets the use of time and/or freshness to indicate that the coffee is always within a predetermined freshness range.

With regard to the use of a count-up timer and freshness indicator, three requirements are needed to reset the sensing and freshness system. First, the system must be uncoupled 90 from server 24. As noted above, the uncoupling may be a physical or operational (control) uncoupling. Either way, the system must acknowledge that the sensing activity has ceased, at least for some predetermined period of time. The use of a predetermined time minimum is useful so as to not confuse the sensing of uncoupling the sensing system from the server when the server is otherwise momentarily jostled where the contents are sloshed within the server. This might occur, for example, if the beverage is in transport such as in a delivery vehicle, in movement from the brewer to a dispensing location, or carried on other vehicles such as ships.

Secondly, the server must be in an emptied condition 94. The emptied condition can be sensed by the sensing system once it is recoupled 98 with the server. Once again, a minimum time may be used to indicate to indicate to the sensing system 20 that the server 24, in fact, has been emptied. Failure to actually empty the server 24 such as by tipping the server 24 on its side or promptly refilling the server 24 with previously brewed coffee can be avoided by providing an appropriately long dwell time for indicating the emptied container condition.

Third, the system must detect the refilling 104 of beverage to a predetermined level as an indication of the dispensing of a fresh beverage 28 into the server 24. In this regard, once the predetermined level 40 or quantity of beverage returned to the server 24 is achieved, the system 20 can reset the freshness timer 52. As noted above, the use of a rate dependent refill can be used to reset the timer. Also, sensors may be placed in different level of the server and monitored for contact or other activation within a generally predetermined time indicating an appropriate refill cycle.

Once the timer 52 has been reset, the system 20 can count-up to a first predetermined time 68. For example, two hours might be used as a first predetermined time. During this counting up cycle the colon will flash 66 indicating active sensing of the time. For the time period between the first predetermined time 70 and the second predetermined time 76 the entire number can flash 72 indicating a second phase of freshness. Once the second predetermined time is achieved the entire number can continue to flash without incrementing the time 78.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. It is envisioned that those skilled in the art may devise various modifications and equivalents without departing from the spirit and scope of the disclosure as recited in the following combinations. Further, this application is intended to cover such departures from the present disclosure as come within the known or customary practice within the art to which it pertains.

The invention claimed is:

1. A beverage dispensing system which includes a server, a sensing system coupled to the server for detecting a quantity of beverage retained in the server, a display coupled to the sensing system, and a count-up timer coupled to the system, the count-up timer being operable to begin counting the time from the start of filling of the beverage server with beverage and operable to being reset only after uncoupling the server from the sensing system, sensing the server is empty and detecting filling of the beverage server to a predetermined quantity of beverage.

2. A method for sensing a quantity of beverage in a beverage server comprising,
   providing a beverage server,
   providing a timer coupled to the server,
   operating the timer to begin counting the time from filling of the beverage server with a predetermined quantity of beverage, and
   resetting the timer to begin counting the time from filling of the beverage server with a predetermined quantity of beverage only after,
   sensing the server is empty, and
   detecting filling of the beverage server with a predetermined quantity of beverage.

3. The method as set forth in claim 2 further comprising providing a freshness indicator.

4. The method as set forth in claim 2 further comprising
   detecting a quantity of beverage retained in the server via a sensing system coupled to the server, and
   preventing resetting until sensing the sensing system has been uncoupled from the server.

5. The method of claim 2 further comprising
   detecting a quantity of beverage retained in the server via a sensing system coupled to the server, and
   preventing resetting of the timer unless removal of the sensing system from the server is detected and after recoupling of the sensing system with the server the sensing system indicates a predetermined quantity of beverage is dispensed into the server.

6. The method as set forth in claim 2 further comprising resetting the timer to begin counting the time from filling of the beverage server with a predetermined quantity of beverage only after uncoupling the server from a sensing system operable to sense the level or quantity of beverage in the beverage server.

7. The method as set forth in claim 2 further comprising operating the timer to count the time to a first predetermined time and then to continue counting to a second predetermined time, stopping counting upon reaching the second predetermined time and displaying an indicia of the second predetermined time.

8. The method as set forth in claim 2 wherein the step of detecting filling comprises filling for at least a minimum time whereby filling for less than the minimum time does not satisfy the requirement of detecting filling of the beverage server with a predetermined quantity of beverage.

9. The method as set forth in claim 2 wherein the step of detecting filling comprises detecting the rate of filling and if the rate is greater than a predetermined maximum rate then the filling does not satisfy the requirement of detecting filling of the beverage server with a predetermined quantity of beverage.

10. The method as set forth in claim 7 further comprising displaying the time to a first predetermined time using a first indicia and displaying the time from the first predetermined time to the second predetermined time using a second indicia.

* * * * *